United States Patent [19]

Livesay

[11] 4,373,758
[45] Feb. 15, 1983

[54] MULTIPLE ROLLER BOGEY ASSEMBLY

[75] Inventor: Richard E. Livesay, Peoria, Ill.

[73] Assignee: Caterpillar Tractor Co., Peoria, Ill.

[21] Appl. No.: 294,759

[22] PCT Filed: Aug. 10, 1981

[86] PCT No.: PCT/US81/01068
§ 371 Date: Aug. 10, 1981
§ 102(e) Date: Aug. 10, 1981

[51] Int. Cl.³ .................... B62D 55/10; B62D 55/30
[52] U.S. Cl. ......................................... 305/22; 305/27
[58] Field of Search .................. 474/133, 134, 135; 180/9.2 R; 305/22, 25, 27, 28, 30, 31

[56] References Cited

U.S. PATENT DOCUMENTS

| 3,774,708 | 11/1973 | Purcell et al. | 180/9.5 |
| 4,339,156 | 7/1982 | Livesay | 305/22 |

FOREIGN PATENT DOCUMENTS

| 2814466 | 10/1978 | Fed. Rep. of Germany | 305/22 |
| 842682 | 6/1939 | France | 305/22 |
| 409225 | 4/1934 | United Kingdom | 305/22 |
| 611543 | 11/1948 | United Kingdom | 305/22 |
| 2048799 | 5/1980 | United Kingdom . | |
| 710858 | 1/1980 | U.S.S.R. | 305/31 |
| 677979 | 8/1979 | U.S.S.R. | 305/22 |

Primary Examiner—David A. Scherbel
Attorney, Agent, or Firm—Richard F. Phillips

[57] ABSTRACT

An undercarriage (12) for a track-type vehicle (14) having: a frame (16), a first link (18) with first and second portions (20,22) and an intermediate pivot portion (24), the first link (18) being pivotally connected to the frame (16); a second link (34) with first and second portions (36,38) and an intermediate pivot portion (40) at which said second link (34) is pivotally attached to said frame (16), said second link second portion (38) and said first link first portion (20) being adjacent and movable each in response to the other; a first wheel (28) connected to the first link second portion (22); a second wheel (42) connected to the second link first portion (36); and, a third wheel (44) connected to the second link second portion (38). This development provides a resilient bogey system in which load sharing occurs between adjacent rollers or adjacent roller assemblies. This development further provides an undercarriage (12) having an odd number of rollers (29), the odd roller (44) being resiliently connected to both an adjacent idler (43) and an adjacent roller assembly (32) in a load sharing manner.

13 Claims, 2 Drawing Figures

MULTIPLE ROLLER BOGEY ASSEMBLY

DESCRIPTION

Technical Field

This invention relates generally to endless track undercarriages and more particularly to bogey configurations suited for use in soft-bottom undercarriages of track-type vehicles.

Background Art

Most land vehicles utilize either wheels or crawler tracks for the purpose of supporting the frame of the vehicle above the ground and for converting power into motion. Crawler tracks, which typically have a relatively great area of ground contact, are fairly rugged and can be designed to substantially conform to depressions and other irregularities in the ground. They are most commonly chosen for vehicles which will be operating where conditions are severe, such as deep snow, battlefields, marshy areas, heavy construction sites, etc.

Typically, endless track undercarriages include a front and a rear idler, which are freely turning wheels around which a track is placed. Several freely turning rollers are mounted between the idlers to transfer the weight of the vehicle to the ground by limiting the upward movement of the track. Further included is a track drive sprocket which serves to convert power from the engine into motion of the tracks, and hence of the vehicle. The idlers and rollers are supported by a roller frame. In many designs, the drive sprocket is located at the extreme rear of the crawler track and replaces one of the idlers.

The technology of endless track type undercarriages has advanced to the point where they are reasonably reliable, durable and efficient. However, there is much yet to be done toward improving the ability of these undercarriage systems to absorb mechanical shocks. It would be further advantageous to improve the load sharing capability of the track rollers. This would equalize the pressure exerted upon the ground by each incremental length of the track. Advancement in these areas will serve to increase the rate at which the vehicles can travel, which is currently limited in most cases by the amount of mechanical shock the vehicle and its operator can absorb. It will also serve to improve the vehicle performance in mud and other conditions where a poor distribution of weight across the track can result in the vehicle becoming unduly mired in the surface across which it is travelling.

In existing crawler track undercarriage systems, mechanical shock is generally dealt with in two manners. The more obvious is through use of traditional shock absorbers. In U.S. Pat. No. 1,836,446, issued to Christie on Dec. 15, 1931, a system is detailed in which the rollers are rotatably mounted on an end of a connecting member. Another end is rotatably connected to the roller frame. The freedom of movement of the member and hence the roller is limited by a coil spring. A related system, using a resilient pad placed between the connecting member and a mechanical stop, is described in U.S. Pat. No. 3,774,708 issued to Purcell et al. on Nov. 27, 1973. Holt, in U.S. Pat. No. 1,317,651, issued Sept. 30, 1919, teaches a similar system involving leaf springs. A combination of a leaf spring suspension for the roller-roller frame mounting and the encasement of each roller axle in a resilient material is set forth in U.S. Pat. No. 1,547,053 issued to Kegresse on July 21, 1925.

A second commonly used system for lessening the amount of shock and the magnitudes of the point loadings transferred from the crawler tracks to the remainder of the vehicle involves the use of some load transfer mechanism. In its simplest form, this is achieved by rotatably connecting two or more rollers to a rigid member known as a bogey which is pivotally connected to the roller frame. When an undercarriage with bogey-mounted rollers passes over a projection, such as a rock, the bogey is caused to rotate about its pivotal connection. This allows the track to deflect upwardly at the point overlying the rock while forcing that part of the track under the corresponding adjacent roller to move downward. In this manner, the pressure exerted upon the ground by the track is reduced at points where a crawler undercarriage with non-bogied rollers would cause very great loading. Compensation is achieved through the increased loading under the other roller on the bogey. In this manner, the occurrence of great variations in the load borne across the length of the track is mitigated. With such a system of ground pressure equalization, the vehicle tends to bog down less often in soft materials such as snow and mud. Mechanical shocks resulting from passing over bumps, ridges, etc. are lessened since the crawler track has a certain degree of resistance. As an additional refinement of such a system, shock absorbing means can be incorporated into the bogie-roller frame mounting of the bogied rollers. See, for example, U.S. Pat. No. 3,774,708 issued to Purcell et al., on Nov. 27, 1973.

An existing difficulty in mounting the rollers on bogies is that bogies are best suited for two rollers. With three rollers on a single bogey, it is likely that one roller will often exert no pressure on the track whatsoever. For example, this would be the case where the ground is perfectly level except for a deep depression under one of the three rollers. In conventional undercarriages with but a single roller which is individually connected to the roller frame, a bogey system is not possible because there is no available load sharing element. Therefore, while adequate technology exists for resiliently mounting an even number of rollers on a roller frame, a difficulty arises when it is necessary to include an odd number of resiliently biased rollers on a crawler track undercarriage. The addition of a single roller may be necessary, for example, to accommodate a specific length of track on the ground for a given vehicle weight. An early solution to this problem was provided by Smythe in U.S. Pat. No. 1,906,116 issued Apr. 25, 1933. Smythe proposed mounting a roller and an idler on a single bogie. There was no provision, however, for any shock absorbing means other than that inherent to the bogie. Consequently, this arrangement transmitted a great deal of mechanical shock to the track frame which dictated the need for lower speeds and strengthened vehicle components.

U.S. Pat. No. 1,836,446, detailed supra, does describe a means for resiliently mounting a single roller. However, this scheme is inferior from the standpoint of load distribution to systems using bogey mountings, and additionally would be unduly expensive to implement.

It is therefore advantageous to provide for resiliently mounting an odd number of rollers on an undercarriage such that each roller can transfer and receive loadings from at least one of the other rollers.

The present invention is directed to overcoming one or more of the problems as set forth above.

Disclosure of the Invention

An undercarriage has a support frame, a first bogey link with first and second portions and a pivot portion. The pivot portion is intermediate the first and second portions. The first bogey link is pivotably connected to the support frame at the pivot portion. A second link has first and second portions and a pivot portion intermediate the first and second portions. The second link is connected to the support frame at said second link pivot portion. The second link second portion is adjacent the first bogey link first portion. The second link second portion and the first bogey link first portion are movable each in response to movement of the other. A first wheel is rotatively connected to said first bogey link second end. A second wheel is rotatively connected to said second link first end. A third wheel is rotatively connected to said second link second end.

In recent years, designers of undercarriages have developed undercarriages having resiliently mounted rollers. In many of these undercarriages a given roller can transfer a portion of the loading to which it is subjected to an adjacent roller. It is believed that no existing soft-bottom undercarriage is constructed for accommodating an odd number of rollers. For undercarriages of certain sizes in which it is desired to obtain the most even ground pressure attainable, the utilization of an odd number of rollers is preferred. It is further preferable to obtain the optimum load transference and resilience among the rollers.

A function of the present development is to permit load transference between roller assemblies which are not mechanically connected. Another function of the present development is to provide an undercarriage having an odd number of rollers with each roller being resiliently mounted and capable of load transference. An additional function of the present development is to provide an undercarriage having an improved load transference between adjacent roller pairs.

BRIEF DESCRIPTION OF THE DRAWINGS

For a better understanding of the present invention, reference may be had to the accompanying drawings in which.

Figure 1:
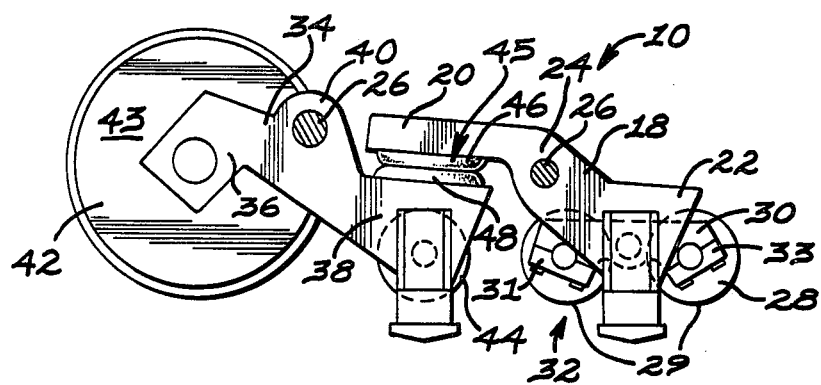
FIG. 1 shows a diagrammatic side view of one embodiment of the present invention.

It is to be understood that the drawings are not intended as a definition of the invention, but are provided for the purpose of illustration only.

BEST MODE FOR CARRYING OUT THE INVENTION

Referring to the drawings, a multiple roller bogey assembly embodying principles of the present development is generally indicated by the reference numeral 10. This multiple roller bogey assembly 10 can be incorporated in the undercarriage 12 of a track type vehicle 14.

Figure 2:
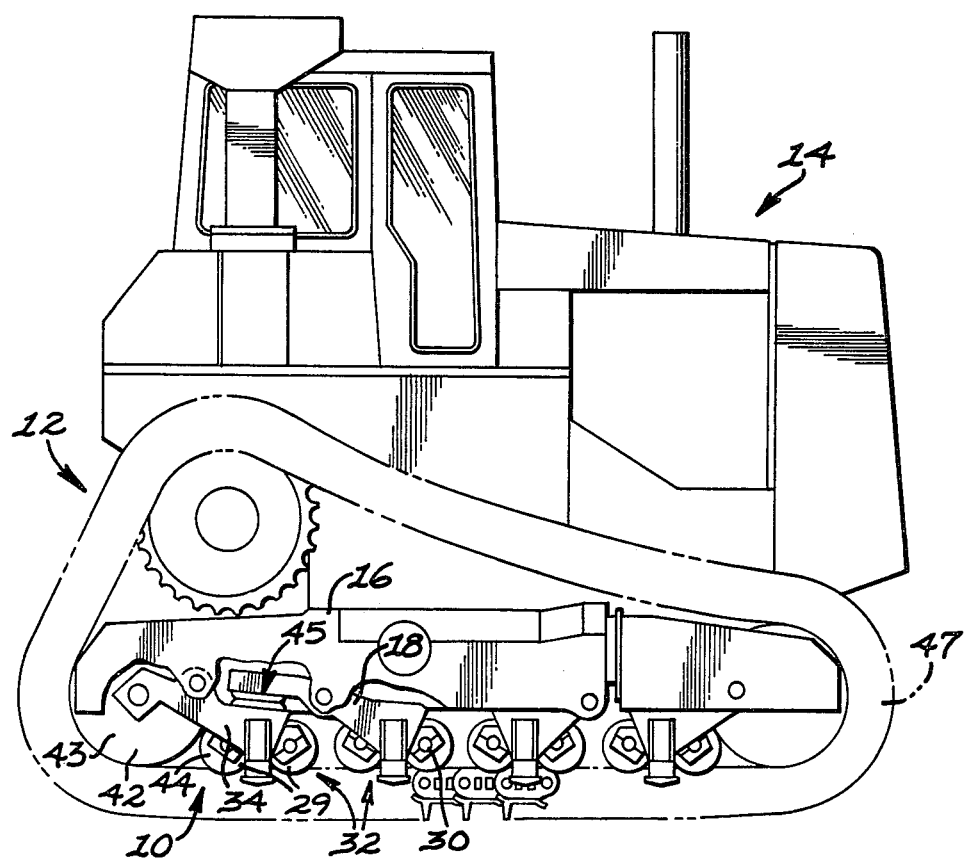
FIG. 2 shows a diagrammatic side view of a track type tractor incorporating a second embodiment of the present invention.

The undercarriage 12 includes a support frame 16 which provides a support for other of the components of the undercarriage 12. Pivotally connected to the support frame 16 is a first bogey link 18. This first bogey link 18 has first and second portions 20,22 and a pivot portion 24 located intermediate said first and second portions 20,22. A connecting element 26, such as, for example, a pin passing through said pivot portion 24, pivotally joins said first bogey link 18 to said support frame 16. Connected to said second portion 22 is a first wheel 28 which preferably is a track roller 29. Alternatively, two rollers 29 can be connected to the first bogey link second portion 22 by a minor bogey 30, having first and second opposed end portions 31,33, as shown in FIGS. 1 and 2. The coupled rollers 29 and the minor bogey 30 form a roller assembly 32. The first wheel 28 is deemed a portion of this roller assembly 32.

A second link 34 is pivotally connected to the support frame 16 at a location spaced from the first bogey link pivot portion 24. This second link 34 has first and second portions 36,38 and a pivot portion 40 intermediate these first and second portions 36,38. A connecting element 26, such as a pin, passes through the second link pivot portion 40 and pivotally joins said second link 34 to the support frame 16. Connected to the second link first portion 36 is a second wheel 42 which is preferably an idler 43, as shown in FIGS. 1 and 2. In an alternative embodiment, this second wheel 42 can be a roller 29. The second wheel 42, if a roller 29, can be a portion of a roller assembly.

A third wheel 44, preferably a roller 29, is rotatively connected to the second link second portion 38. This third wheel 44 is a portion of a roller assembly 32 similar to that detailed previously. The various wheels, idlers and sprockets support an endless track chain 47 in a manner well known to those skilled in the art.

The first bogey link first portion 20 is positioned above the second link second portion 38. A resilient device 45 is positioned intermediate the first bogey link 18 and the second link 34. Preferably, a first resilient element 46 is attached to the underside of the first bogey link first portion 20, and a second resilient element 48 is attached to the upper side of the second link second portion 38. These elements 46,48 are in contact one with the other and permit the first bogey link 18 and the second link 34 to act one against the other through the resilient elements 46,48 in a cushioned manner. In the preferred embodiment, the resilient device 45 incorporates an elastomeric pad such as a rubber biscuit. In an alternative embodiment, the resilient device 45 comprises a single elastomeric pad.

In another embodiment of the multiple roller support assembly 10, the second link 34 has only a pivot portion 40 and a second portion 38. The second link second portion 38 is adjacent and beneath the first bogey link first portion 20. Both the second link second portion 38 and the first bogey link second portion 22 have a roller 29 attached thereto. In such an alternate embodiment, at least one of the second link second portion 38 and the first bogey link second portion 22 can have a roller assembly 32 attached thereto. Such an embodiment would closely resemble that shown in FIG. 1 with the second link first portion 36 and the corresponding idler 43 deleted.

Industrial Applicability

The multiple roller bogey assembly 10 is especially well suited for use in an undercarriage of a track type vehicle 14. The first bogey link second end 22 and the second link second end 38 are each biased downwardly in response to an upward force acting on the other. The resilient device 45 intermediate the first bogey link first portion 20 and the second link second portion 38 provides the multiple roller bogey assembly 10 with resiliency and renders it suitable for use in a soft bottom undercarriage 12.

More specifically, in the operation of the multiple roller bogey assembly 10 load transference and resiliency are advantageously provided. An upward force acting on the third wheel 44 serves to force the second link second portion 38 upwardly. In response, the second link second portion 36 rotates downwardly transferring a portion of the load to the second wheel 42. Simultaneously, the upward displacement of the second link second portion 38 acts on the first bogey link first portion 20 through the resilient device 45. The first bogey link first portion 20 is displaced upwardly as a result, forcing the first bogey link second portion 22 downwardly. As the first wheel 28 is rotatively connected to the first bogey link first portion 20, upward displacement of the third wheel 44 results in downward displacement of the first wheel 28. This results in additional load transference away from the third wheel 44 in response to a sudden loading of the third wheel 44. Similarly, load transference occurs for excessive loading of the first wheel 28.

Either the first or the third wheel can be an idler 43 and any of the three wheels 28,42,44 can be an individual roller 29 or a roller assembly 32. This provides the multiple roller bogey assembly 10 with great flexibility and adapts it to be used at the front, rear or intermediate portions of an undercarriage 12.

Other aspects, objects, advantages and uses of this invention can be obtained from a study of the drawings, the disclosure and the appended claims.

I claim:

1. An undercarriage (12) adapted for use on a track-type vehicle (14), comprising:
   a support frame (16);
   a first bogey link (18) having first and second portions (20,22) and a pivot portion (24) intermediate said first and second portions (20,22), said first bogey link (18) being pivotably connected to said support frame (16) at said pivot portion (24);
   a second link (34) having a second portion (38) and a pivot portion (40), said second link (34) being pivotably connected to said support frame (16) at said second link pivot portion (40), said second link second portion (38) being adjacent said first bogey link first portion (20), and said second link second portion (38) and said first bogey link first portion (20) each being movable in response to movement of the other;
   a first wheel (28) rotatively connected to said first bogey link second portion (22); and
   a third wheel (44) rotatively connected to said second link second portion (38), said third wheel (44) being intermediate said first bogey link pivot portion (24) and said second link pivot portion (40).

2. The undercarriage (12), as set forth in claim 1, wherein said first bogey link first portion (20) is spaced a vertical distance from said second bogey link second portion (38), there being a resilient element (45) intermediate said first bogey link first portion (20) and said second bogey link second portion (38).

3. The undercarriage (12), as set forth in claim 1, wherein said second link (34) includes a first portion (36), said second link pivot portion (40) being positioned intermediate said second link first portion (36) and said second link second portion (38), and said undercarriage (12) includes a second wheel (42) rotatively connected to said second link first portion (36).

4. The undercarriage (12), as set forth in claim 3, including a first resilient element (46) connected to said first bogey link first portion (20) at a position intermediate said first bogey link first portion (20) and said second link second portion (38).

5. The undercarriage (12), as set forth in claim 3, including a second resilient element (48) connected to said second link second portion (38) at a position intermediate said second link second portion (38) and said first bogey link first portion (20).

6. The undercarriage (12), as set forth in claim 3, wherein said second wheel (42) is an idler and said first and third wheels (28,44) are rollers.

7. The undercarriage (12), as set forth in claim 6, including a resilient element (45) connected to one of said second link second portion (38) and said first bogey link first portion (20), said resilient element (45) being positioned intermediate and in contact with said second link second portion (38) and said first bogey link first portion (20); and
   a minor bogey (30) having first and second opposed end portions (31,33) and being pivotally connected to said first bogey link second portion (22);
   said first roller (28) being rotatively connected to the first end portion (31) of the minor bogie (30); and
   a fourth roller (29) rotatively connected to the second of said end portion (33).

8. The undercarriage (12), as set forth in claim 1, including a first resilient element (46) connected to said first bogey link first portion (20) at a position intermediate said first bogey link first portion (20) and said second link second portion (38).

9. The undercarriage (12), as set forth in claim 1, including a second resilient element (48) connected to said second link second portion (38) at a position intermediate said second link second portion (38) and said first bogey link first portion (20).

10. The undercarriage (12), as set forth in claim 1, wherein said first and third wheels (28,44) are rollers.

11. The undercarriage (12), as set forth in claim 10, further including a minor bogey (30) having first and second opposed end portions (31,33) and being pivotally connected to said first bogey link second portion (22);
   said first wheel (28) being rotatively connected to the first end portion (31) of the minor bogie (30); and
   a fourth roller (29) rotatively connected to the second end portion (33) of said minor bogie (30).

12. The undercarriage (12), as set forth in claim 1, wherein at least a portion of said second link second portion (38) is substantially beneath said first bogey link first portion (20).

13. In a track-type vehicle (14) including an undercarriage (12) having a support frame (16), an endless track (47), a first bogey link (18) having a pivot portion (24), and a second portion (22), means (26) for pivotally connecting said first bogey link pivot portion (24) to said support frame (16), a second bogey link (34) having a pivot portion (40) and a second portion (38), means (26) for pivotally connecting said second link pivot portion (40) to said support frame (16), a roller assembly (32) attached to said first bogey link second portion (22) and being in contact with said track (47); and a third roller (44) rotatively connected to said second link second portion (38) and being in contact with said track (47); the improvement comprising:
   said first bogey link (18) having a first portion (20), said first bogey link pivot portion (24) being intermediate said first bogey link first and second portions (20,22), said first bogey link first portion (20) extending to a position above said second link second portion (38); and a resilient element (45) being positioned intermediate said first bogey link first portion (20) and second bogey link second portion (38) and connected to at least one of said first bogey link (20) and said second link (34) and in contact with both of said first bogey link (20) and said second link (34).

* * * * *